United States Patent Office 2,924,388
Patented Feb. 9, 1960

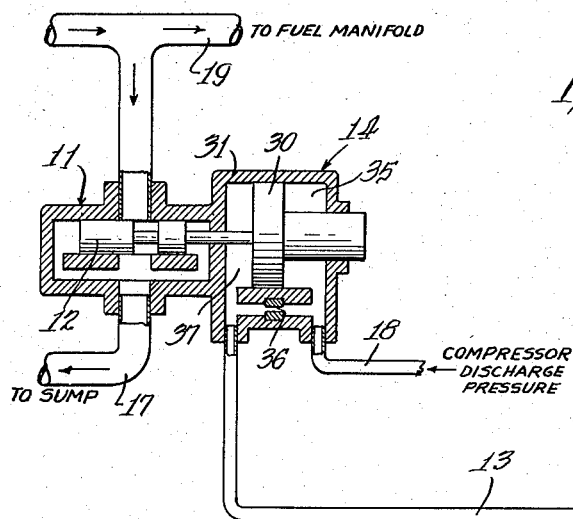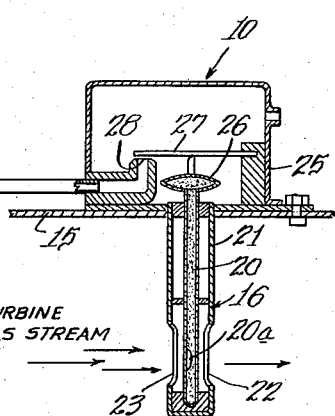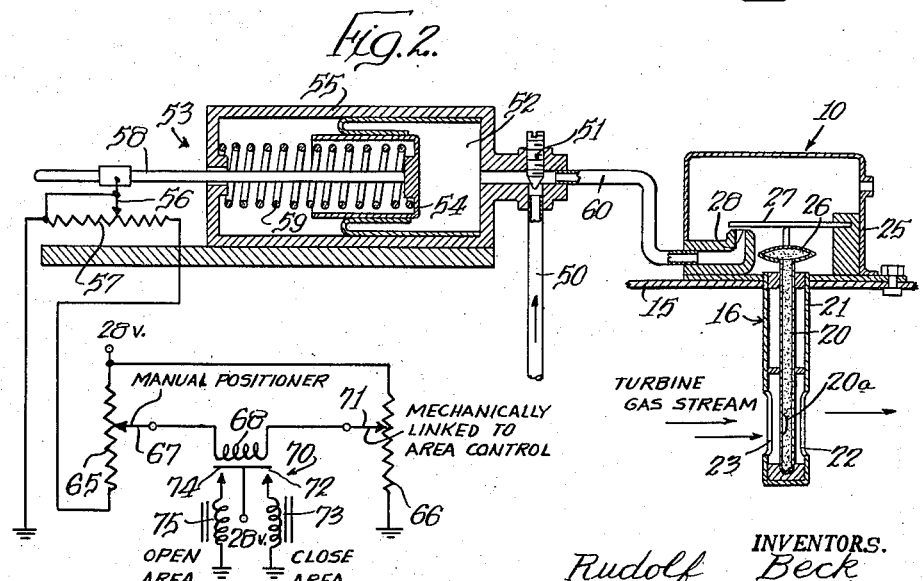

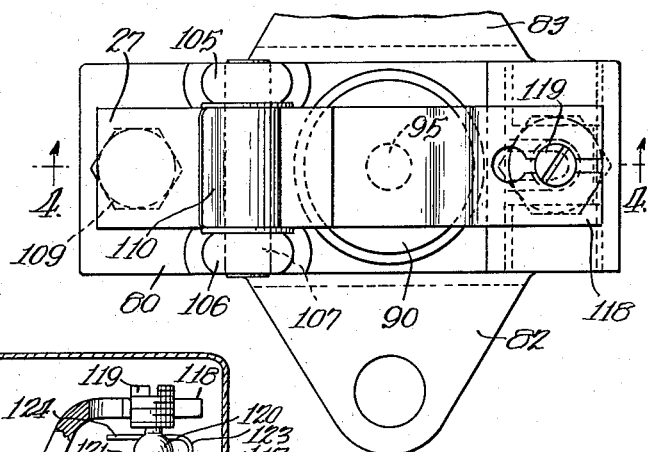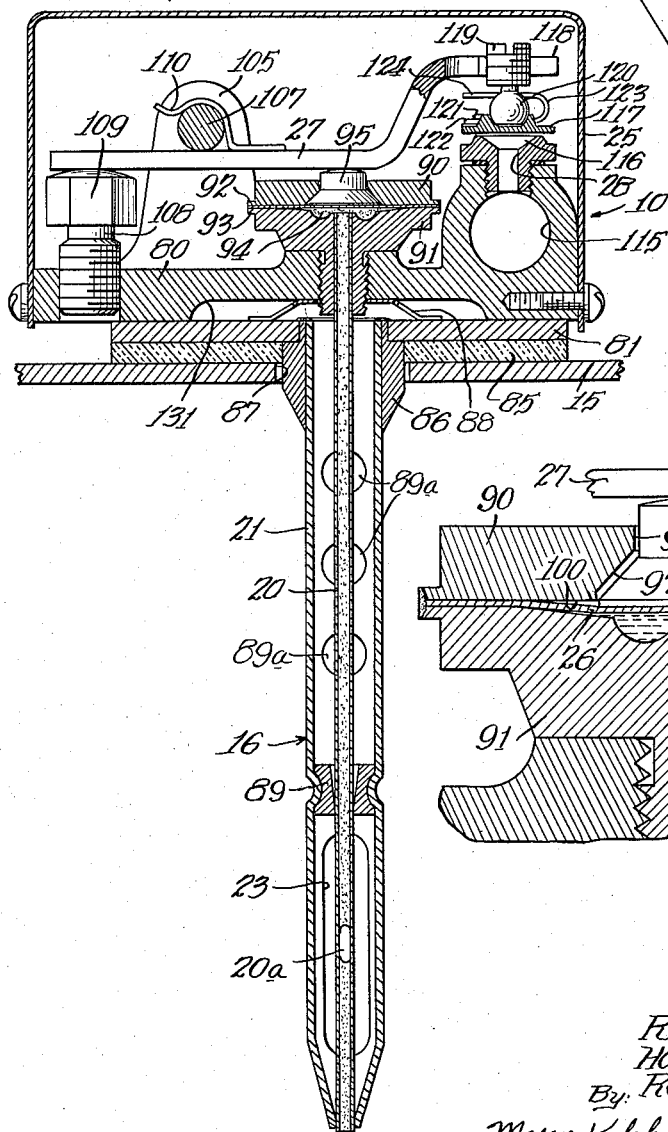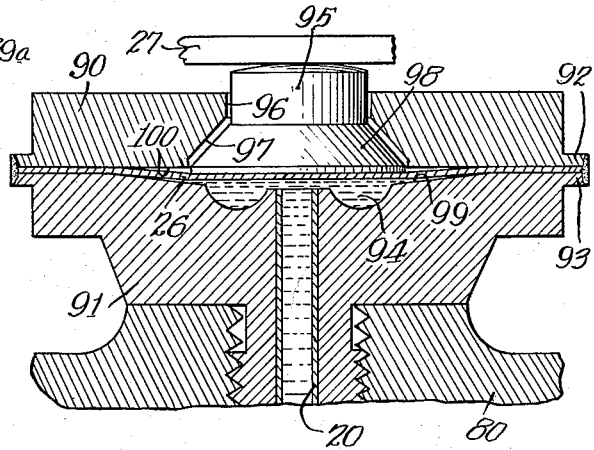

2,924,388
HIGH TEMPERATURE CONTROL APPARATUS

Rudolf Beck, Fairfield, and Hans W. Kretsch and Robert W. Stewart, Bridgeport, Conn., assignors, by mesne assignments, to Consolidated Controls Corp., a corporation of New York Application June 28, 1954, Serial No. 439,784

5 Claims. (Cl. 236—99)

The present invention relates to high temperature control systems and apparatus, and, more particularly, to high temperature control systems and apparatus employing a mercury vapor tension temperature sensing unit which is extremely rugged in construction, is quick acting in its response to temperature changes and is simple and economical to manufacture.

While the invention is of general utility, it is particularly adapted for use in and will be described in detail in connection with the control of an aircraft power plant of the gas turbine type in accordance with temperature variations in the turbine inlet or exhaust gas stream. In the temperature control arrangements heretofore proposed in connection with gas turbine control, a thermocouple array is usually employed to detect temperature changes in the gas stream. The electrical thermocouple output signal is amplified to a suitable power level in an electronic amplifier, which requires a separate power supply for the vacuum tubes thereof, and the amplified signal is employed to control the driving motor or other device used to actuate the fuel valve or exercise a temperature trim function. While these prior art arrangements provide sufficiently accurate control, they are quite bulky and heavy for aircraft operation and are also complicated and hard to service and maintain in operation. In other gas turbine control arrangements a temperature sensing unit of the rod expansion type has been employed. However, these arrangements are subject to a considerable time lag between actual temperature change and the response of the thermal unit so that precise control is not obtained.

In the general temperature indicating field it is customary to use a liquid, vapor or gas filled bulb connected through a capillary tubing to a pressure responsive element in the form of a Bourdon tube to indicate at a remote point the temperature variations in the measuring zone adjacent the bulb. However, for control applications such arrangements suffer from the disadvantage that a considerable pressure-transmission lag is experienced, i.e., a lag in transmitting the pressure change in the bulb through the capillary connecting tubing to the pressure-spring. In some vapor pressure systems, wherein the bulb is partially filled with a volatile liquid, the pressure-transmission lag may be as high as a minute or more, a condition which is entirely unsuitable for producing a sensitive control function. Also, in the case of gas-filled systems, the internal volume of the bulb should be made large in comparison to the internal volume of the capillary tubing and pressure-spring to reduce the effect of ambient temperature changes and a thermometric lag in the heat transfer from the fluid being measured to the gas in the bulb is produced. In addition, the Bourdon tube pressure-spring arrangements are not suitable for use in applications such as aircraft control systems because they will not withstand the severe shock and vibration tests to which equipment of this type must be subjected. Furthermore, in aircraft control systems the capillary tube arrangement suffers from the disadvantage that when the system is subjected to extreme cold, i.e., when the engine is idle, the mercury in the capillary tube freezes. When the engine is started and the temperature rises, a considerable length of time is required to thaw out the complete system since heat is primarily conducted through the small thread of mercury within the tube. As a result the engine may overheat before the control system starts functioning and the system may be permanently damaged due to the unequal expansion along the tube.

It is, therefore, a primary object of the present invention to provide a new and improved high temperature control system and apparatus wherein one or more of the above described disadvantages of the prior art arrangements is eliminated.

It is another object of the present invention to provide a new and improved high temperature control system for aircraft power plants of the gas turbine type which is much simpler and of lighter weight than prior art control systems of the thermocouple type.

It is still another object of the present invention to provide a new and improved high temperature control system wherein a mercury vapor tension control unit is provided which has extremely small pressure-transmission lag and is adapted to withstand severe shock and vibration without damage thereto.

It is another object of the present invention to provide a new and improved mercury-filled temperature control system for aircraft engines which responds rapidly to abrupt changes in temperature from below the freezing point of mercury to engine operating temperature.

It is a further object of the present invention to provide a new and improved high temperature control unit in which mercury vapor is employed as the thermosensitive element and wherein facilities are provided for preventing damage to the pressure-responsive element when temperatures above the control point are encountered.

It is a still further object of the present invention to provide a new and improved mercury vapor tension control unit which is particularly adapted to function with pneumatic control systems and wherein control of the pressure fluid control orifice is accomplished in a positive and reliable manner in accordance with temperature variations.

The invention, both as to its organization and method of operation, together with further objects and advantages thereof, will best be understood by reference to the following specification taken in connection with the accompanying drawings, in which:

Fig. 1 is a diagrammatic view of a high temperature control system embodying the features of the present invention;

Fig. 2 is a diagrammatic view of an alternative control system embodying the features of the present invention;

Fig. 3 is a plan view of the high temperature control unit employed in the system of Figs. 1 and 2 with the cover of the unit removed;

Fig. 4 is a sectional side elevational view taken along the lines 4—4 of Fig. 3; and Fig. 5 is a fragmentary sectional view, taken on a larger scale, of the diaphragm portion of the control unit shown in Fig. 4.

Referring now to drawings, and more particularly to the high temperature control system shown in Fig. 1 thereof, the present invention is therein illustrated as comprising a high temperature control unit, indicated generally at 10, which employs mercury vapor as the thermosensitive fluid, and a fuel control valve of the servo type, indicated generally at 11, the movable control valve element 12 of the valve 11 being controlled by means of a pneumatically operated pressure ratio control device 14 which is connected to the control unit 10 by means of the pneumatic control line 13. In the embodiment shown in Fig. 1, the high temperature control system of the present invention is arranged to provide a temperature override control for an engine suitable for jet propulsion, propeller propulsion or combined propeller-and-jet propulsion of aircraft. Such engines generally include an air inlet, an air compressor, one or more combustion chambers, a gas turbine and a tail pipe for discharging combustion gases to the atmosphere. Associated with the engine is a fuel pump (not shown) for delivering fuel under the control of appropriate scheduling means through the conduit 19 to the fuel manifold of the engine, and the fuel valve 11 is arranged to bleed off fuel through the conduit 17 to the fuel return or sump when engine speed and temperature exceeds a predetermined maximum value or control point.

The high temperature control unit 10 is secured to the side wall 15 of the annular fluid flow passageway of the engine and includes a probe unit, indicated generally at 16, which extends into the turbine inlet gas stream, or other desired measuring zone in the engine. In order to provide a temperature sensing device which is sufficiently rugged to withstand the force of the jet stream and the normal shock and vibration of aircraft operation, while providing a sufficiently sensitive unit that precise control can be maintained at the high temperatures involved without introducing substantial time lag in the system, the probe unit 16 comprises a mercury filled tube 20 which is surrounded by a tubular protective member 21 provided with openings 22 and 23 through which the outer end portion of the tube 20 is directly exposed to the hot combustion gases. As the temperature approaches the control point, a small bubble 20a of mercury vapor is formed in the tube 20, in a manner to be explained in more detail hereinafter, the mercury vapor pressure exerting force on a flexible diaphragm 26 positioned within the housing 25 of the control unit 10 and in direct communication with the mercury in the tube 20. The diaphragm 26 is arranged to exert force on a deflectable beam 27 which is mounted in the housing 25 in such manner that when a sufficiently large force is exerted thereon the beam 27 is bent or deflected away from a control orifice 28 connected to the control line 13.

The pressure ratio control device 14 is supplied with unregulated compressor discharge air through the conduit 18 and includes a piston element 30 which is slidably mounted in the housing 31 and is connected to the valve element 12 so as to control the position thereof. Compressor discharge air is supplied to a first chamber 35 of relatively small area, and is also supplied through the pressure reducing orifice 36 to a second chamber 37 on the other side of the piston 30, the control orifice 28 being connected through the control conduit 13 to the chamber 37 so as to control the pressure therein. In order to prevent changes in the position of the valve element 12 due to variations in the supply air pressure, the pressure drop across the orifice 36 and the active piston areas are so chosen that the piston 30 does not change position as long as the pressure ratio across it remains constant. However, variation of the control orifice 28 varies the pressure ratio across the piston 30 so as to control the position of the valve element 12.

Considering now the operation of the high temperature control system shown in Fig. 1 and assuming that the temperature of the turbine inlet gas stream rises above the high temperature control point, as the pressure on the diaphragm 26 increases the beam 27 is deflected so as to increase the opening of the control orifice 28 thereby reducing the pressure in the chamber 37. As a result, the piston 30 is moved to the left and the slide valve element 12 is opened so that a greater amount of fuel is bled off to the sump through the conduit 17 and the supply of fuel to the combustion apparatus of the engine is reduced.

As the temperature of the turbine inlet gas stream is accordingly reduced, the pressure on the diaphragm 26 is reduced so that the opening of the control orifice 28 is reduced with the consequent closure of the valve element 12. It will be noted that since the mercury filled tube 20 is in direct communication with the diaphragm 26 a relatively small total volume of mercury is required so that the pressure transmission lag normally encountered in capillary tube arrangements is substantially eliminated and a very fast response ratio is achieved. It will also be noted that the entire control system of Fig. 1 is mechanically and pneumatically controlled so that electronic amplifiers and drive motors are not required to achieve the desired control function. Furthermore, due to the rapid response rate of the mercury vapor tension control unit 10, a sensitivity of control substantially equal to the conventional thermocouple input system is provided while requiring a much less complicated and lighter weight control system which is particularly desirable for aircraft applications. In this connection it will be understood that a plurality of control units 10 may be provided, each connected to the control line 13, so that averaging of the temperature variations at various positions may be obtained.

In Fig. 2 an exhaust nozzle control system for an aircraft engine is shown wherein a temperature trimming function is achieved by a control system embodying the features of the present invention. In the system of Fig. 2, regulated air pressure, which may be drawn from the compressor of the engine, is supplied through the conduit 50 to the adjustable needle valve 51 and is admitted to the chamber 52 of a piston operated potentiometer control unit indicated generally at 53. In the unit 53, a piston 54 is slidably mounted within the cylinder 55 and the arm 56 of a potentiometer 57 is connected to the piston shaft 58 so as to be moved thereby. The control air is also supplied through the conduit 60 to the control orifice 28 of the high temperature control unit 10 and closure of the control orifice 28 is controlled in accordance with the deflection of the beam 27 in the manner described above in connection with the system of Fig. 1.

In the system of Fig. 2 the temperature trim control system is illustrated in connection with a conventional exhaust nozzle control system wherein a slide wire follow-up system is employed to control the area of the exhaust nozzle of the engine in accordance with the position of a manually operable control element. More particularly, the area control system includes a first slide wire potentiometer 65, which is connected in series with the potentiometer 57 from the 28 volt supply to ground, and a second slide wire potentiometer 66, which is also connected from the 28 volt supply to ground. The arm 67 of the potentiometer 65 is manually adjustable by means of the conventional manual positioner element and is connected through the control winding 68 of a reverse current relay, indicated generally at 70, to the arm 71 of the slide wire potentiometer 66. When the arm 67 is adjusted to a desired position, current will flow through the winding 68 unless the arm 71 of the slide wire potentiometer 66 is at the same potential as the arm 67. If the potential of the arm 71 is less than that of the arm 67 the contacts 72 of the relay 70 are closed so as to energize the area closing device 73 which functions to reduce the area of the exhaust nozzle. The arm 71 of the potentiometer 66 is mechanically linked to the exhaust nozzle area control so that the potential of the arm 71 is increased as the nozzle area is decreased until the potential of the arm 71 is equal to the potential of the arm 67, at which time current ceases to flow through the control winding 68. On the other hand, if the potential of the arm 71 is greater than that of the arm 67, current flows through the winding 68 in the reverse direction so that the contacts 74 of the relay 70 are closed and an area opening control device 75 is energized so that the area of the exhaust nozzle is increased to a point at which the potential of the arm 71 is equal to the potential of the arm 67 at which time the relay 70 is brought to its zero current or balanced position.

In the system of Fig. 2, a temperature trim control function is provided by the high temperature control unit 10 and the potentiometer unit 53. Thus, when the temperature of the turbine inlet gas stream increases the beam 27 is deflected in a direction to increase the opening of the control orifice 28 so that the pressure in the chamber 52 is reduced and the piston 54 is moved to the right, as viewed in Fig. 2, under the force of the biasing spring 59. As a result, the arm 56 of the slide wire potentiometer 57 is moved in the direction to decrease the effective series resistance of the potentiometer 57 so that the potential of the arm 67 is decreased. When the potential of the arm 67 is decreased, the open area contacts 74 of the relay 70 are closed so that the normal area scheduling control is overcome for an over-temperature condition and the exhaust nozzle area is increased. When the temperature of the gas stream decreases, the effective series resistance of the potentiometer 57 is increased so as to provide a temperature trim component in the exhaust nozzle area control system and cause a reduction in the nozzle area in the manner described above.

Considering now in more detail the features of the high temperature control unit 10 shown in Figs. 3 to 5, inclusive, of the drawings, whereby operation in the high temperature control systems described above is provided in accordance with the present invention, the control unit 10 includes a metallic body member 80 which is projection welded to the central portion of a mounting plate 81, the plate 81 preferably being of low heat conductivity metal and provided with offset end portions 82 and 83 which are adapted to be bolted or otherwise secured to the side wall 15 of the annular fluid flow passageway of the engine. A gasket 85 of suitable insulating material, such as asbestos, is positioned between the center portion of the mounting plate 81 and the side wall 80 so as to reduce direct heat conduction from the side wall 15 and to provide a gas tight seal. A partial pressure sealing element 88 is positioned between the members 80 and 81 to prevent loss of pressure through the member 21 in situations where the temperature measurement is made in a relatively high pressure zone. The tubular protective member 21 is positioned within a bushing 86 carried by the mounting plate 81 which extends through the clearance hole 87 in the side wall 15, the tubular member 21 being spun over the end of the bushing 86 so as to form an integral part of the mounting plate 81. A spacer 89 is provided to maintain the tube 20 and protective member 21 in concentric relation, the spacer 89 contacting the tube 20 at only one edge thereof to minimize heat conduction from the tube 20 to the lower temperature member 21. Also, the end portion of the member 21 is tapered so as to provide for minimum area of contact with the tube 20. A plurality of apertures 89a are provided in the tubular member 21 to provide more uniform temperature conditions along the length of the tube 20. The flexible diaphragm 26 is positioned between an upper diaphragm supporting member 90 and a lower diaphragm supporting member 91, the members 90 and 91 being provided with peripheral flanges 92 and 93 which are heli-arc welded around the circumference thereof so as to support the edges of the diaphragm 26 therebetween. The lower diaphragm supporting member 91 is threaded into a central opening in the body member 80 and the member 91 is provided with an annular depression 94 so that the upper end of the tube 20 can be secured to the member 91 by a suitable welding operation or the like. Preferably, the tube 20 is of a high nickel-chromium iron alloy having good corrosion resistance and good high temperature properties.

In order to deflect the beam 27 in accordance with movement of the diaphragm 26 while providing an arrangement for protecting the diaphragm 26 against rupture in the event the control unit 10 is subjected to temperatures considerably in excess of the control point, there is provided a force transmitting member 95 which rests on the upper side of the diaphragm 26 and extends through a clearance hole 96 in the upper diaphragm supporting member to the underside of the beam 27. The member 90 is provided with a conical seat portion 97 and the force transmitting member 95 is provided with a conical head portion 98 which is adapted to fit into the conical seat portion 97 when the diaphragm 26 is moved upwardly against the bottom surface 100 of the upper diaphragm supporting member 90. Accordingly, when the force on the diaphragm 26 becomes sufficiently great, the member 95 seats in the conical portion 97 and a flat supporting surface is provided for the entire area of the diaphragm so that damage to the diaphragm is prevented. Furthermore, as the conical head portion 98 is moved upwardly, a self centering action is produced whereby the position of the member 95 on the diaphragm 26 is adjusted so that the members 95 and 90 fit together and form a smooth surface which acts as a positive stop for the diaphragm 26. In the other extreme position the diaphragm 26 rests on the slightly inclined annular top surface 99 of the lower diaphragm supporting member 91 and the distance between the members 90 and 91 at the outer edge of the conical head portion 98 is very small, preferably in the order of 3 to 5 thousandths of an inch, so that the total travel of the diaphragm 26 is very small and the elastic limit of the diaphragm is not exceeded. In this connection, it will be understood that the clearance hole 96 in the member 90 is sufficiently large to permit the above described self centering action of the member 95 as the head portion 98 is seated in the conical seat 97.

The deflectable beam 27 is preferably in the form of a flat, metal bar which is of sufficient thickness that the beam 27 is deflected only a few thousandths of an inch when subjected to forces developed in the mercury filled system of the order of several hundred pounds per square inch. The beam 27 rests on the upper end of the force transmitting member 95 and on the hexagonal head portion 109 of an adjustable supporting post 108 which is threaded into the body member 80. The beam 27 is also positioned against a transversely extending bearing pin 107 which is supported at either end thereof on a pair of upstanding bearing posts 105 and 106 formed integrally with the body member 80. During periods when the beam 27 is not forcibly held against the pin 107, the beam 27 is retained in approximately the correct position by means of the retaining spring 110 which is spot welded to the beam 27 and clips over the pin 107. In this connection, it will be noted that the pressure responsive diaphragm and deflectable beam arrangement of the present invention has a much higher force to mass ratio than the conventional Bourdon spring arrangement. Thus, in a typical Bourdon tube structure, the force acting at the tip of the tube may be only a few pounds for an applied force of several thousand pounds, whereas with the direct transmission of force from the flexible diaphragm 26 to the beam 27 a much greater ratio of force to mass is produced under the same conditions. As a result, the pressure responsive unit of the present invention is much less susceptible to vibration and can withstand high accelerations and decelerations without affecting the operation of the device. Furthermore, with the deflectable beam arrangement of the present invention a considerably greater control force is developed so that a control function requiring considerable power may be effected.

In order to produce a pneumatic control function in accordance with deflection of the beam 27, the body member 80 is provided with a passageway 115 which is connected to the control conduit 13 in the system of Fig. 1, for example, and the control orifice 28 is threaded into the body member 80 so as communicate with the passageway 115. The orifice 28 is provided with an outwardly flared mouth portion 116 for increased sensitivity of control and a baffle member 117 is adapted to vary the effective opening of the mouth portion 116 of the control orifice 28. In order to permit positive closure of the orifice 28 even though the deflectable beam 27 may be positioned at a slight angle to the mouth portion 116, the baffle 117 is connected to the offset end portion 118 of the beam 27 by means of a universal joint arrangement so that positive closure of the orifice 28 by the baffle member 117 is assured. More particularly, an adjustment stud 119 is threaded into the end portion 118 of the beam 27 and is provided with a spherical end portion 120 on which the baffle 117 is seated. The baffle 117 is provided with a flange portion 121 which is adapted to receive the bifurcated lower arm 122 of a U-shaped retaining spring 123, the upper bifurcated arm of the spring 123 engaging the upper side of the spherical end portion 120 so that the baffle member 117 is held against the spherical end portion 120 of the adjustment stud 119 and may be tilted by the required amount to provide complete closure of the orifice 28. In this connection it will be understood that under certain conditions the control orifice 28 must be tightly closed to provide good sensitivity and speed up the response of the control system. If the above described universal joint arrangement is not provided, the baffle member 117 may be tilted slightly and strike one edge of the mouth portion 116 of the control orifice 28 so that complete closure of the orifice is prevented. It will also be noted that with the arrangement of the present invention a relatively small movement of the diaphragm 26 produces a proportionately larger movement of the baffle member 117 so that increased sensitivity of control is achieved.

Considering now the manner in which the high temperature control unit 10 is assembled and functions in developing the desired control function, it will be understood that the diaphragm unit is first inserted into the protective member 21 with the force transmitting member 95 loosely positioned on top of the diaphragm 26. The deflectable beam 27 is then secured on the pin 107 and the height of the post 109 is adjusted so as to develop the desired preloading force which must be overcome to provide movement of the baffle member 117. The tube 20 and annular space 94, which together have a much smaller volume than the bulb of a conventional capillary tube instrument and may, for example, have a total volume of only .0025 cubic inch, are filled solidly with liquid mercury at a temperature from 100° to 200° F. below the desired control point. As the temperature increases the mercury expands linearly until the pressure of the system reaches the mercury vapor pressure at a temperature slightly below the control point, for example, 20° F. below the control point. When this occurs, the small mercury vapor bubble 20a is formed in the tube 20 and the pressure of the system increases rapidly as the control point is reached. The bubble 20a is formed at the highest temperature portion of the tube 20 and since the tube 20 is directly exposed to the gas stream through the opening 23, the bubble forms in the exposed portion of the tube and on the side of the tube exposed to the hot gas flow, as best illustrated in Fig. 1. In this connection it will be understood that the upper portion of the tube 20 and the extremity thereof are partially shielded by the tubular protective member 21 so that these portions of the tube 20 are cooler than the portion exposed through the opening 23.

As the temperature increases further the mercury vapor pressure rises exponentially and the mercury vapor bubble 20a increases in size so that it extends across the entire width of the tube 20. The movement of the diaphragm 26 is so chosen that when the diaphragm 26 has been forced upwardly against the positive stop defined by the bottom surface of the supporting member 90 and the coextensive surface of the force transmitting member 95, the mercury bubble 20a is still sufficiently small so that it is exposed to the gas stream flowing through the opening 23. If, for example, it is assumed that the volume of the system is increased by one-fifth when the diaphragm is in its uppermost position, the maximum length of the mercury bubble 20a will be approximately one-fifth the length of the tube 20 and the length of the openings 22 and 23 is chosen accordingly. In this connection it will be understood that the annular space 94 is not shown to scale in Fig. 5 and is preferably a relatively small proportion of the total system volume. With this arrangement, the meniscus formed at the mercury-mercury vapor junction is, at all times, positioned within the desired temperature measuring zone, i.e., the hot gas stream flowing through the opening 23. In this connection it will be understood that if the tube 20 is filled solidly with mercury at room temperature instead of the above described 100° to 200° F. below the desired control point, the volume of the system must be made considerably larger to accommodate the additional volume of liquid mercury expansion between the room temperature and the indicated filling temperature. Thus, if the control point is 1050° F. and the tube 20 is filled solidly with mercury at 800° F. instead of at room temperature, the expansion volume may be made approximately 35% smaller than if the tube 20 is filled with mercury at room temperature.

In order to provide compensation for weakening of the deflectable beam 27 at the extremely high temperatures at which the control unit 10 operates, the adjustable supporting post 108 is preferably constructed of a metal having a higher temperature coefficient of expansion than the body member 80, the supporting members 90 and 91, and the force transmitting member 95. With this arrangement, as the beam 27 weakens at high temperatures, a compensating increasing force on the beam 27 is produced due to the expansion of the post 108 relative to the pin 107 and the force transmitting member 95. It will also be noted that the beam 27 is positioned substantially parallel to the temperature measuring zone and the unit 10 is of flat construction so that expansion of the parts due to the proximity to the high temperature measuring zone is uniform and does not result in variations of the position of the baffle member 117. Also, the body member 80 is provided with a recess 131 in the bottom portion thereof so that conduction from the tube 20 to the mounting plate 81 is reduced. Furthermore, since the entire mercury filled system is of extremely small volume and is located substantially entirely in the high temperature measuring zone, the system is particularly adapted for aircraft control. Thus, if the temperature falls below the freezing point of mercury when the engine is idle and then the engine is started so that the temperature rises very rapidly, the mercury filled system will become fluid again very quickly and can function properly to prevent overheating. However, when the conventional capillary tube system becomes frozen a considerable time lag is required to thaw out the system since most of the tube is not in the high temperature measuring zone and heat is transmitted relatively slowly through the mercury within the tube so that the system may not develop the desired control action in time to prevent overheating.

While the control unit 10 has been illustrated in conjunction with a pneumatic control system it will be understood that movement of the deflectable beam 27 may be employed to affect any other desired control function. For example, movement of the end portion 118 of the beam 27 may be employed to actuate an electrical contact arrangement so as to open and close an electrical circuit in any suitable electrical control system. Obviously, other control functions may be derived from movement of the beam 27, as will be readily apparent to those skilled in the art.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A unitary temperature responsive control device for an aircraft power plant of the gas turbine type wherein a fluid flow passageway is provided, comprising a body member adapted to be secured to a wall of said passageway, a rigid tubular shield member connected to said body member and adapted to extend into said passageway through an opening in said wall, a flexible diaphragm secured at the edges thereof to said body member, a tube positioned within said shield member and communicating with one side of said diaphragm, a force transmitting member positioned on the other side of said diaphragm, a rigid support member spaced from said diaphragm on said body member, a deformable beam positioned on said force transmitting member and said support member, a fulcrum member supported on said body member and engaging said beam intermediate said force transmitting member and said support member, means defining a positive stop for preventing movement of said diaphragm away from said beam, said fulcrum member and said support member having relative positions such that said diaphragm is normally biased into engagement with said stop with a predetermined loading force, means defining opposed openings in said tubular shield member so that said tube is exposed to hot gases flowing through said passageway, a thermosensitive material in said tube which vaporizes in the region adjacent said openings when the temperature of the hot gases flowing through said passageway exceeds a predetermined value, said thermosensitive material exerting sufficient force on said diaphragm when said predetermined temperature value is reached to move said diaphragm away from said stop by bending said beam about said fulcrum member and against the bias of said loading force, and means including a control element movable with said beam for producing a control function in accordance with movement of said diaphragm away from said stop.

2. A unitary temperature responsive control device for an aircraft power plant of the gas turbine type wherein a fluid flow passageway is provided, comprising a body member adapted to be secured to a wall of said passageway, a rigid tubular shield member connected to said body member and adapted to extend into said passageway through an opening in said wall, a flexible diaphragm secured at the edges thereof to said body member, a tube positioned within said shield member and communicating with one side of said diaphragm, a force transmitting member positioned on the other side of said diaphragm, a rigid support member spaced from said diaphragm on said body member, a deformable beam positioned on said force transmitting member and said support member, a fulcrum member supported on said body member and engaging said beam intermediate said force transmitting member and said support member, means defining a positive stop for preventing movement of said diaphragm away from said beam, said fulcrum member and said support member having relative positions such that said diaphragm is normally biased into engagement with said stop with a predetermined loading force, means defining at least one opening in said tubular shield member so that said tube is exposed to hot gases flowing through said passageway, a thermosensitive material in said tube which vaporizes in the region adjacent said opening when the temperature of the hot gases flowing through said passageway exceeds a predetermined value, said thermosensitive material exerting sufficient force on said diaphragm when said predetermined temperature value is reached to move said diaphragm away from said stop by bending said beam about said fulcrum member and against the bias of said loading force, and means including a control element movable with said beam for producing a control function in accordance with movement of said diaphragm away from said stop.

3. A unitary temperature responsive control device for an aircraft power plant of the gas turbine type wherein a fluid flow passageway is provided, comprising a body member adapted to be secured to a wall of said passageway, a flexible diaphragm secured at the edges thereof to said body member, a tube adapted to extend through an opening in said wall and communicating with one side of said diaphragm, a force transmitting member positioned on the other side of said diaphragm, a support member spaced from said diaphragm on said body member, a deformable beam positioned on said force transmitting member and said supporting member, a fulcrum member supported on said body member and engaging said beam intermediate said force transmitting member and said support member, means defining a positive stop for preventing movement of said diaphragm away from said beam, said fulcrum member and said support member having relative positions such that said diaphragm is normally biased into engagement with said stop with a predetermined loading force, means for exposing said tube to hot gases flowing through said passageway, a thermosensitive material in said tube which vaporizes in said exposed portion thereof when the temperature of the hot gases flowing through said passageway exceeds a predetermined value, said thermosensitive material exerting sufficient force on said diaphragm when said predetermined temperature value is reached to move said diaphragm away from said stop by bending said beam about said fulcrum member and against the bias of said loading force, and means including a control element movable with said beam for producing a control function in accordance with movement of said diaphragm away from said stop.

4. A unitary temperature responsive control device for an aircraft power plant of the gas turbine type wherein a fluid flow passageway is provided, comprising a body member adapted to be secured to a wall of said passageway, a flexible diaphragm secured at the edges thereof to said body member, a tube adapted to extend through an opening in said wall and communicating with one side of said diaphragm, a force transmitting member positioned on the other side of said diaphragm, a loading member spaced from said diaphragm on said body member, a deformable beam positioned on said force transmitting member and said loading member, a fulcrum member supported on said body member and engaging said beam intermediate said force transmitting member and said loading member, means defining a positive stop for preventing movement of said diaphragm away from said beam, said fulcrum member and said loading member having relative positions such that said diaphragm is normally biased into engagement with said stop with a predetermined loading force, means for exposing said tube to hot gases flowing through said passageway, a thermosensitive material in said tube which vaporizes in said exposed portion thereof when the temperature of the hot gases flowing through said passageway exceeds a predetermined value, said thermosensitive material exerting sufficient force on said diaphragm when said predetermined temperature value is reached to move said diaphragm away from said stop by bending said beam about said fulcrum member and against the bias of said loading force, means including a control element movable with said beam for producing a control function in accordance with movement of said diaphragm away from said stop, and means for adjusting the position of said loading member in the direction to vary said preloading force on said beam, thereby to adjust said temperature control point.

5. A unitary temperature responsive control device for an aircraft power plant of the gas turbine type wherein a fluid flow passageway is provided, comprising a body member adapted to be secured to a wall of said passageway, a flexible diaphragm secured at the edges thereof to said body member, a tube adapted to extend through an opening in said wall and communicating with one side of said diaphragm, a force transmitting member positioned on the other side of said diaphragm, a support member spaced from said diaphragm on said body member, a deformable beam positioned on said force transmitting member and said supporting member, a fulcrum member supported on said body member and engaging said beam intermediate said force transmitting member and said support member, means defining a positive stop for preventing movement of said beam in one direction, said fulcrum member and said support member having relative positions such that a predetermined loading force is exerted on said beam, means for exposing said tube to hot gases flowing through said passageway, a thermosensitive material in said tube which vaporizes in said exposed portion thereof when the temperature of the hot gases flowing through said passageway exceeds a predetermined value, said thermosensitive material exerting sufficient force on said diaphragm when said predetermined temperature value is reached to move said beam in the opposite direction by bending said beam about said fulcrum member and against the bias of said loading force, and means including a control element movable with said beam for producing a control function in accordance with movement of said diaphragm.

References Cited in the file of this patent

UNITED STATES PATENTS

| | | | |
|---|---|---|---|
| 36,741 | Warren | Oct. 21, | 1862 |
| 92,237 | Wesson | July 6, | 1869 |
| 424,363 | Singer | Mar. 25, | 1890 |
| 662,092 | Roesch | Nov. 20, | 1900 |
| 1,089,382 | Sabo | Mar. 3, | 1914 |
| 1,166,027 | Weisgerber et al. | Dec. 28, | 1915 |
| 1,712,657 | Frankenberg | May 14, | 1929 |
| 1,876,822 | Mansure | Sept. 13, | 1932 |
| 1,950,120 | McKee | Mar. 6, | 1934 |
| 2,230,777 | Hey | Feb. 4, | 1941 |
| 2,564,263 | Ifield | Aug. 14, | 1951 |
| 2,575,879 | Lombard | Nov. 20, | 1951 |
| 2,621,630 | Ifield | Dec. 16, | 1952 |
| 2,667,743 | Lee | Feb. 2, | 1954 |
| 2,670,989 | Ramsay | Mar. 2, | 1954 |
| 2,683,348 | Petry | July 13, | 1954 |

FOREIGN PATENTS

| | | | |
|---|---|---|---|
| 605,093 | Great Britain | July 15, | 1948 |
| 251,103 | Great Britain | Apr. 29, | 1926 |